Patented Sept. 1, 1936

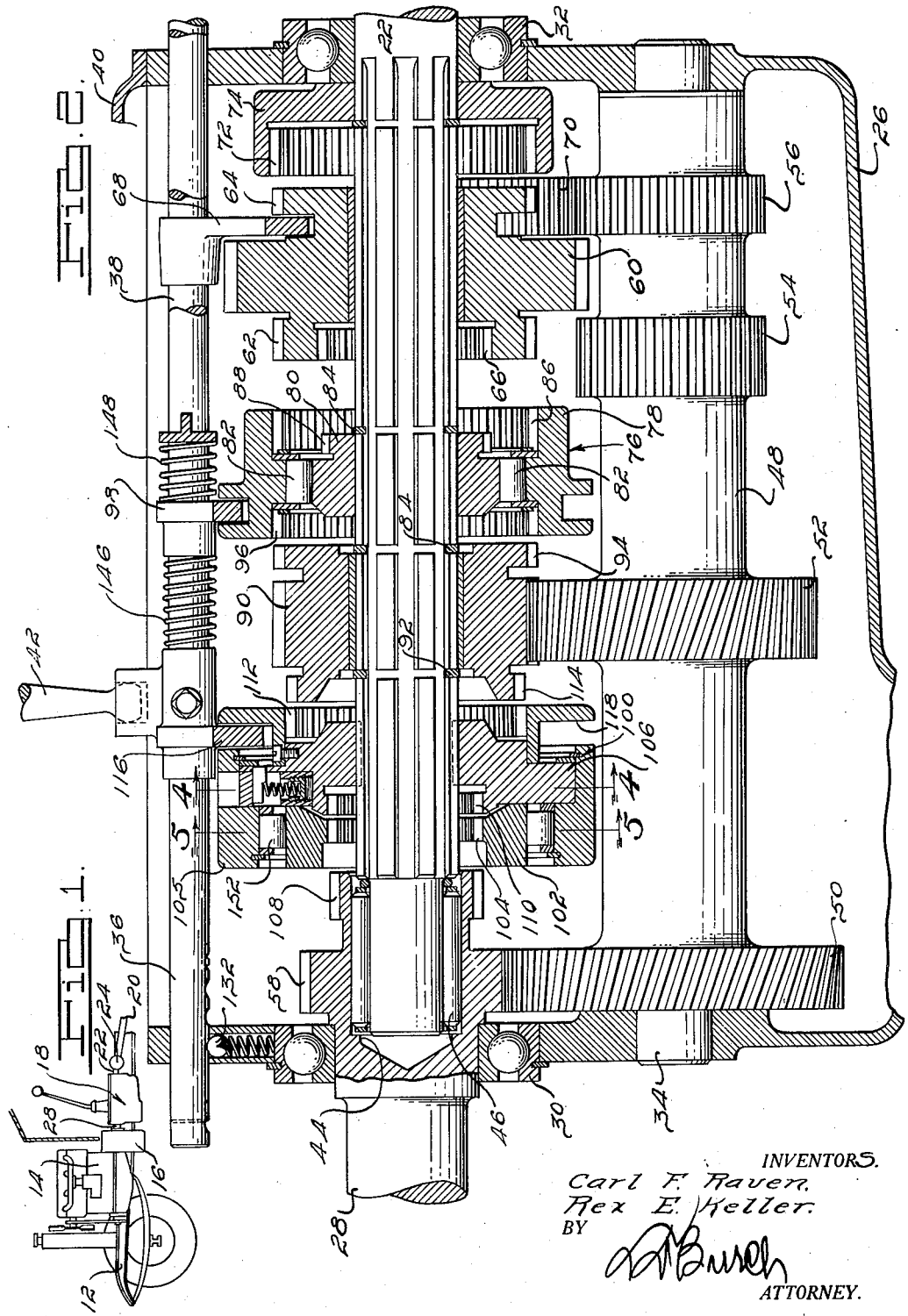

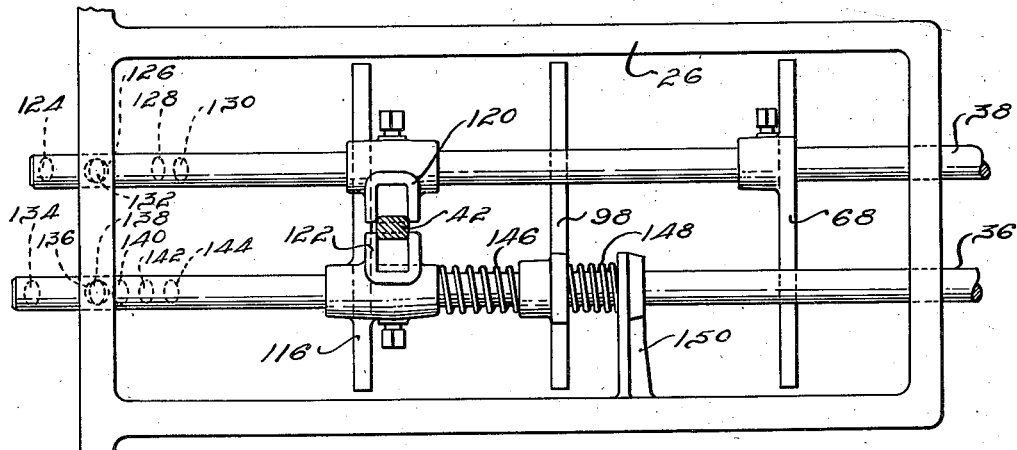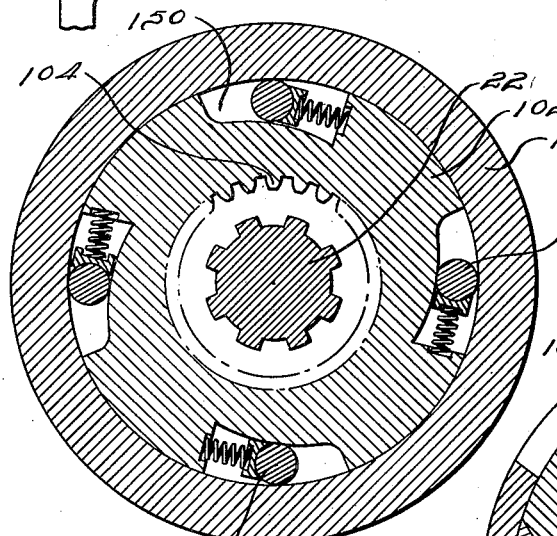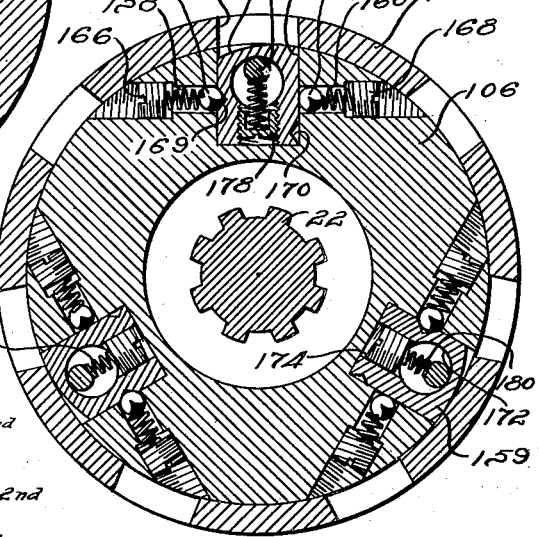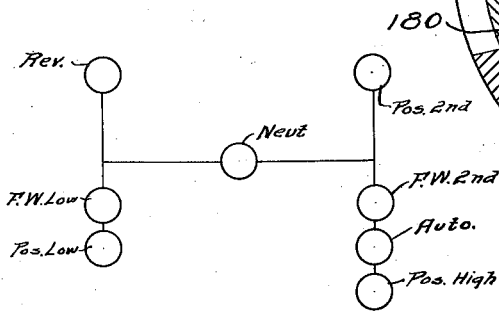

2,053,109

UNITED STATES PATENT OFFICE 2,053,109

AUTOMATIC TRANSMISSION

Carl F. Rauen, Grosse Pointe, Mich., and Rex E. Keller, Beverly Hills, Calif.; said Rauen assignor, by mesne assignments, to Borg-Warner Corporation, a corporation of Illinois Application November 4, 1933, Serial No. 696,628

14 Claims. (Cl. 74—336)

Our invention relates to automatic transmissions or speed changing mechanisms and, as illustrated, is particularly adapted for use in automotive vehicles. Our invention contemplates the provision in an automatic transmission or speed changing mechanism, of means operable for providing either a one-way or free wheeling drive, or a two-way or positive drive in all forward speeds, together with means normally operable responsive to predetermined conditions of operation for automatically effecting a change in the driving ratio.

An object of our invention is, therefore, to provide an automatic transmission in which normally a change in the driving ratio may be automatically effected under any one of a plurality of predetermined conditions of operation.

Another object of our invention is to provide a transmission in which free wheeling and positive drives are provided in all forward speeds.

Another object of our invention is to provide in a transmission a plurality of individual clutch units which may be controlled for providing optional free wheeling drives in any forward speed.

Another object of our invention is to provide an automatic transmission in which the automatic speed changing unit is normally disposed in an inoperative position, but which is shiftable into a plurality of operative positions for providing a plurality of drives.

Another object of our invention is to provide in a transmission, in which normally a change in the driving ratio may be automatically effected under any one of a plurality of predetermined conditions of operation, means for manually effecting a change in the driving ratio without regard to the automatic speed changing mechanism.

Other objects and advantages will appear from the following specification with reference to the accompanying drawings of which there are two sheets and in which:

Fig. 1 is a diagrammatic view illustrating a portion of an automotive vehicle in which our automatic transmission has been incorporated;

Fig. 2 is a longitudinal view partly in section disclosing the internal construction of our automatic transmission;

Fig. 3 is a top plan view of the yoke rod mechanism for the transmission illustrated in Fig. 2;

Fig. 4 is a vertical cross sectional view taken on the line 4—4 of Fig. 2, looking in the direction of the arrows and illustrating the constructional details of the automatic clutch or speed changing mechanism;

Fig. 5 is a vertical cross sectional view taken on the line 5—5 of Fig. 2 and looking in the direction of the arrows and illustrating the constructional details of the overrunning or free wheeling clutch; and, Fig. 6 is a diagrammatic view of the different positions for the handle of the gear shift lever.

Referring now particularly to Fig. 1 of the drawings, there is diagrammatically illustrated a portion of an automotive vehicle having a main frame 12 providing a support for an engine 14, a housing-enclosed clutch mechanism 16, a transmission indicated generally at 18, and a propeller shaft 20, which is adapted to be connected to the driven shaft 22 of the transmission by a suitable universal joint mechanism 24.

The transmission indicated generally as 18 and the internal construction of which is illustrated in Fig. 2, comprises, in general, a casing 26 providing a housing for the operating mechanism and a support for a driving shaft 28, journaled in a bearing 30 suitably secured in an aperture in the forward wall of the transmission casing 26, the driven shaft 22 journaled in a bearing 32 suitably secured in an aperture in the rearward wall of the transmission casing, a countershaft 34 secured against rotation in the forward and rearward walls of the casing 26, a pair of yoke rods 36 and 38 slidably secured in the forward and rearward walls of the casing at the top thereof, and a cover plate 40 providing a closure for the casing 26 and a support for the manual shift lever 42. The driving shaft 28 is adapted to be connected through the medium of the housing-enclosed clutch 16 to the engine 14, and is provided at its rearward end with a counterbore 44 in which a roller bearing 46 is provided for supporting the forward end of the driven shaft 22.

The countershaft 34 supports a freely rotatable cluster of gears 48 comprising helical gears 50 and 52 and gears 54 and 56. A portion of the driving shaft 28 adjacent the rearward end thereof and within the casing 26 may be formed to provide a helical gear 58 adapted constantly to mesh with the helical gear 50 of the cluster of gears for the purpose of rotating the same with the driving shaft 28. The driven shaft 22 is splined throughout the major portion of its length and is adapted freely to support a gear 60 provided with external sets of teeth 62 and 64 and an internal set of teeth 66.

The gear 60 is adapted to be moved to the right, looking at Fig. 2, by a fork 68 carried by the yoke rod 38 to mesh with an idler gear 70 suitably secured within the casing and in mesh with gear 50 of the cluster of gears and for meshing teeth 64 with an internal set of teeth 72 provided on a hub 74 fixedly secured to the driven shaft 22 for the purpose of effecting a reverse drive between the driving and the driven shafts and through the intermediary of helical gears 58 and 50, gears 56, 70 and 60, and hub 74, which is rigidly secured to the driven shaft 22.

A clutch unit indicated generally at 76 is slidably splined to the driven shaft 22 and comprises a driving or free wheeling member 78, a driven or positive member 80, and a series of rollers 82 disposed in eccentric raceways provided between the driving and driven members and adapted to be forced into the narrower end of such raceways for locking the driving and driven members together for rotation when the driving member tends to overrun the driven member in one direction only.

Clutch unit 76 is, in principle and construction, similar to the overrunning clutch illustrated in Fig. 5, presently to be described. Lateral movement of the clutch unit 76 is limited by snap rings 84 secured to the driven shaft 22. The driving or free wheeling member 78 of the clutch unit is provided with an internal set of teeth 86 adapted to mesh with the external set of teeth 62 provided on the gear 60, when the gear 60 has been moved to the left, looking at Fig. 2, into mesh with the gear 54 for the purpose of providing a low speed free wheeling drive between the driving and the driven shafts and through the intermediary of helical gears 58 and 50, gears 54 and 60, driving clutch member 78, rollers 82, and driven clutch member 80 which is splined to the driven shaft 22.

Further movement of the gear 60 to the left to mesh teeth 66 thereof with an external set of teeth 88 provided on the positive or driven member 80 of the clutch is adapted to provide a positive low speed drive between the driving and the driven shafts and through the intermediary of helical gears 58, 50, gears 54 and 60, and clutch member 80 which is splined to the driven shaft 22. It will be noted that when a positive low speed drive is provided, the free wheeling action of the clutch unit 76 will be eliminated because the gear 60 is connected directly to the driven member 80 of the clutch unit.

A helical intermediate speed gear 90 is rotatably mounted on the driven shaft 22 and confined against lateral displacement by one of the snap rings 84 and by a thrust ring 92 suitably secured to the driven shaft 22. Helical gear 90 is provided with a free wheeling clutch member comprising radial external teeth 94 which are adapted to mesh with an internal set of teeth 96 provided on the driving member 78 of the clutch unit 76.

The clutch unit 76 is adapted to be moved to the left, looking at Fig. 2, by a spring loaded fork 98 carried by the yoke rod 36 to mesh teeth 96 of the clutch unit with the teeth 94 on the helical gear 90 to provide an intermediate speed free wheeling drive between the driving and the driven shafts and through the intermediary of helical gears 58, 50, 52 and 90, and driving member 78, rollers 82 and driven member 80 of the clutch unit 76.

A clutch unit, indicated generally at 100 and comprising a driving member 102, an intermediate member 105, and a driven member 106, is slidably splined to the forward end of the driven shaft 22.

The driving member 102 is provided with an internal set of teeth 104 and comprises a free wheeling clutch member which is adapted to engage the gear or clutch element 108 formed on the posterior end of the driving shaft 28. The driven member 106 comprises a positive clutch member and is provided with an internal set of teeth 110 adapted to be moved into engagement with the gear or clutch element 108, and with an internal set of teeth 112 which are adapted to be moved into engagement with an external set of teeth 114 provided on the helical gear 90 and comprising a positive clutch member. A shift fork 116 engages a groove 118 in the clutch unit and is rigidly affixed to the yoke rod 36 for the purpose of shifting the clutch unit.

Yoke rods 38 and 36 are each provided with a gate 120 and 122, respectively, which are adapted to receive the bottom end of the shift lever 42 so that the shift forks carried by the yoke rods may be moved by manipulation of the shift lever 42. The yoke rod 38 is provided on the under side thereof with a plurality of notches 124, 126, 128 and 130 and corresponding respectively with the reverse, neutral, free wheeling low and positive low positions of the yoke rod 38 and are adapted to be engaged by a spring pressed poppet 132 carried in the forward wall of the transmission casing for the purpose of locating the different positions of the shift fork 68.

Yoke rod 36 is similarly provided on its under side with a plurality of notches 134, 136, 140, 142 and 144 corresponding respectively with the positive second, neutral, free wheeling second, automatic, and positive high positions of the yoke rod 36 and which notches are adapted to be engaged by a poppet such as 132 disposed in the forward wall of the transmission casing for the purpose of locating the different positions of the shift rod 36 and holding the same against accidental displacement. The shift fork 98 is slidably positioned on the yoke rod 36 between springs 146 and 148. Spring 146 is backed by the gate 122, and spring 148 is backed by an arm 150, laterally projecting from the side wall of the transmission casing and encircling the yoke rod 36. The spring 148 normally is under compression so that when the gate 122 is moved to the left, looking at Figs. 2 and 3, the tension of the spring 148 will be sufficient to move the shift fork 98 and clutch unit 76 to the left.

Fig. 5 illustrates the details of the overrunning clutch mechanism of the clutch unit 100 which is similar in construction and operation to the clutch unit 76. The driving member 102 is provided with a plurality of circumferentially disposed eccentric raceways 150 in each of which there is disposed a spring pressed roller 152 which permits the intermediate member 105 to overrun the driving member 102, but will lock the intermediate member 105 to the driving member 102 when the latter tends to rotate at a rate of speed in excess of that of the intermediate member 105. The intermediate member 105 is provided with a plurality of circumferentially disposed slots 154. The driven member or core 106 is provided with a plurality of radially extending grooves or slots 156 in each of which there is slidably disposed a bolt 159. Each of the grooves 156 is provided with a pair of oppositely disposed perpendicular bores 158 and 160, each of which has disposed therein a spring pressed poppet 162 and 164, respectively, and which are backed by adjustable threaded plugs 166 and 168 respectively.

The poppets 162 are adapted to engage in a notch 169 provided on one side of the bolt 159, and the spring pressed poppets 164 are adapted to engage in a notch 170 provided on the opposite side of the bolt but offset with respect to the notch 169. Each of the bolts 159 are provided with a transverse bore 172 and a longitudinally extending bore 174. A pin 176 carried by the driven member or core 106 projects into the transverse bore 172 and is adapted to confine between a flatted portion thereof and an adjustable plug 178 threadedly secured in the bore 174 of the bolt 159, a spring 180 for the purpose of resiliently holding the bolt in its retracted position, as shown. Each of the bolts 159 is further provided with an eccentric or beveled face 182. The slots 154 are slightly greater in width than the bolts 159, preferably several thousandths of an inch.

The bolts 159 are adapted to be moved radially outwardly responsive to centrifugal force resulting from rotation of the core 106. The tension of the spring 180 may be adjusted by means of the threaded plug 178 for determining the speed of rotation of the driven member 106 at which the bolts 159 will move outwardly. The spring 180 tends to restrain the outward movement of the bolts 159. The spring pressed poppets 162 engaging in the notches 169 tend to hold the bolts in their inner or retracted position until the centrifugal force resulting from rotation of the driven member 106 is sufficient to overcome the thrust of the spring pressed poppet 162, when the bolt 159 will snap or fly outwardly. The spring pressed poppets 164 are adapted to engage in the notches 170 when the bolts 159 are in their outward position for the purpose of restraining inward movement of the bolts 159 by the force of the spring 180 when the centrifugal force resulting from rotation of the driven member 106 is insufficient to hold the bolts in their outward position.

Due to the shifting of the center of gravity of the bolts radially outwardly when they are moved to their outward position, a lower speed of rotation of the driven member 106 will be sufficient to hold the bolts 159 in their outward position than that which is necessary to move the bolts 159 outwardly. Engagement of the spring pressed poppets 164 in the notches 170 will tend to restrain the inward movement of the bolts 159 until the force of the spring 180 is greater than the centrifugal force resulting from rotation of the driven member 106 and the thrust force of the poppets 164. The eccentric or beveled faces 182 of the bolts are adapted to cause the same to jump the slots 154 when the intermediate member 105 is rotating at a rate of speed substantially in excess of that of the driven member 106. It will be noted that the driven member 106 is provided with a lesser number of bolts 159 than is the intermediate member 106 provided with slots 154. For that reason only one of the bolts 159 can be in its outward position at any one time.

When the speed of rotation of the intermediate member 105 is decelerated relative to that of the driven member 106 to approximately the same speed thereof, one of the bolts 159 will be projected into one of the slots 154, assuming that the speed of rotation of the driven member 106 is sufficient to overcome the force of the spring 180 and of the poppets 162. Movement of one of the bolts 159 to its outward or projected position will lock the members 105 and 106 together for rotation as a unit.

Movement of the handle of the shift lever 42 to free wheeling second position will shift the clutch unit 100 to the left, looking at Fig. 2, and will relieve the pressure of the spring 146 upon the shift fork 98 so that the spring 148 may expand and move the clutch unit 76 to the left to mesh teeth 96 thereof with teeth 94 on the helical gear 90.

In this position the transmission will be in free wheeling second or intermediate, and the drive will be through the intermediary of helical gears 58, 50, 52 and 90 and clutch unit 76. Movement of the handle of the shift lever 42 to automatic position will shift the clutch unit 100 further to the left, looking at Fig. 2, until the teeth 104 internally provided on the driving member 102 of the clutch unit 100 are in mesh with the gear or clutch element 108 provided on the posterior end of the driving shaft 28. In this position the drive will continue through the intermediary just described until the speed of rotation of the driven member 106 of the clutch unit which is slidably splined to the driven shaft 22 is sufficient to project one of the bolts 159 radially outwardly. The clutch unit 100 may be moved relative to the clutch unit 76 since the fork 98 controlling the operative condition thereof is spring loaded on the yoke rod 36.

No one of the bolts 159 can engage any one of the slots 154 until the speed of rotation of the intermediate member 105 is decelerated relative to that of the driven member 106. This relative deceleration may be accomplished by a temporary closing of the engine throttle when the intermediate member 105 which heretofore has been rotating with the driving shaft 28 will decelerate until its speed approximates that of the driven member 106. At this point one of the bolts 159 will be projected outwardly, and further relative deceleration of the intermediate member 105 will be prevented.

The driven shaft 22 and driven member 80 of the clutch unit 76 will overrun the driving member 82 of the clutch unit 76 when the clutch 100 becomes operative to drive the driven shaft directly from the driving shaft 28. The drive through the members 102, 105 and 106 of the clutch unit 100 will be a free wheeling drive because the rollers 152 will permit the intermediate member 105 to overrun the driving member 102.

Movement of the handle of the shift lever 42 to positive high position, indicated in Fig. 6, will shift the clutch unit 100 to an extreme leftmost position for the purpose of meshing teeth 110 provided on the driven member 106 with the gear or clutch element 108 to provide a direct positive high speed drive between the driving and the driven shafts. When the transmission is in direct positive high gear, the overrunning and automatic clutch mechanisms of the clutch unit 100 will, in effect, be locked out and inoperative. A shift from automatic high to positive high may be made when the teeth 104 and 110 are in alignment, by a temporary closing of the engine throttle and a manipulation of the shift lever 42. Assuming that the transmission is in automatic high gear, a subsequent deceleration of the speed of rotation of the driven shaft below that necessary to hold the bolt 159 in its outward position, will permit the spring 180 to move the bolt inwardly when the intermediate speed helical gear 90 will again become operative to drive the driven shaft 22 through the intermediary of the clutch unit 76.

The clutch unit 100 is adapted to be moved to the right from the position shown in Fig. 2 by movement of the handle of the shift lever 42 to positive second position, indicated in Fig. 6, to mesh teeth 112 provided on the core 106 with the external teeth 114 provided on the forward end of the intermediate speed helical gear 90 to effect a positive intermediate drive between the driving and the driven shafts and through the intermediary of helical gears 58, 50, 52 and 90 and driven member 106 of the clutch unit 100 which is slidably splined to the driven shaft 22. When the transmission is in either positive or free wheeling second, the clutch unit 100 will be inoperative automatically to effect a change between intermediate and a high speed drive for the reason that the clutch unit 100 will be rotating with the shaft 22 and will not be connected to the driving shaft 28 through the gear or clutch element 108.

While several specific embodiments of our invention have been illustrated and described, it must be appreciated that many modifications may be made in the construction thereof without departing from the scope of the invention, and for that reason we do not desire to be limited to any particular form or arrangement except in so far as such limitations are included in the following claims.

We claim:

1. In a device of the class described, the combination of a driving shaft having a high speed driving element thereon, a driven shaft having a low speed driving element rotatably mounted thereon and connected through a train of speed reduction gearing to said driving shaft, a shiftable overrunning clutch cooperable with said driven shaft element for providing a one-way low speed drive between said shafts, a shiftable clutch unit including a part connected to said driven shaft for rotation therewith and a plurality of clutch elements carried by said part, said clutch elements being adapted upon shifting of said unit to be selectively connected to said driving elements, said clutch unit further including an overrunning clutch and a centrifugal clutch adapted to form an operative connection between said part and one of said clutch elements connectible to said high speed driving element, means for progressively shifting said overrunning clutch into cooperative engagement with said driven shaft element and a clutch element of said clutch unit into cooperative engagement with said driving shaft element, said shifting means embodying provisions whereby said clutch unit may be shifted relative to said shiftable overrunning clutch for selectively connecting other clutch elements on said unit with said driving elements.

2. In a device of the class described, the combination of a driving shaft having a high speed driving element thereon, a driven shaft having a low speed driving element rotatably mounted thereon, and connected through a train of speed reduction gearing to the driving shaft, a free wheeling clutch slidably mounted on said driven shaft and adapted to be moved into engagement with said low speed element to provide a one-way drive between said shafts, a clutch unit slidably mounted on the driven shaft and provided with positive and free wheeling drive clutch members, each of which is adapted to be selectively moved into engagement with said high speed element to provide a two-way and a one-way drive respectively between said shafts, means for shifting said free wheeling clutch into engagement with said low speed element and for subsequently shifting said clutch unit into engagement with said high speed element when said free wheeling clutch is in engagement with said low speed element, said means including a lost motion connection between said clutch and clutch unit whereby said clutch unit may be moved relative to said clutch, and centrifugal means carried by said clutch unit and operable only when the free wheeling drive clutch member thereon is in engagement with said high speed element for driving said driven shaft directly from said driving shaft and for shunting said free wheeling clutch out of the driving connection between said shafts.

3. In a device of the class described, the combination of a driving shaft, a driven shaft, a high speed driving element on the driving shaft, a low speed driving element rotatable on the driven shaft and connected to be driven from said driving shaft, a shiftable overrunning clutch member for connecting the low speed element to said driven shaft to provide an overrunning drive, a clutch unit carried by the driven shaft and shiftable into engagement with said high speed element, said clutch unit embodying overrunning clutch means and being provided with means operable responsive to a predetermined speed of rotation of said driven shaft for providing a free wheeling high speed drive between said shafts, a yoke rod, shift forks for said clutch member and said clutch unit and carried by said yoke rod, manipulative means for moving said yoke rod for shifting said clutch member into engagement with said low speed element to provide a low speed overrunning drive and for subsequently shifting said clutch unit relative to said clutch member and into engagement with said high speed element whereby said means are operable for changing the drive between said shafts from a low speed to a high speed overrunning drive.

4. In a device of the class described, the combination of driving and driven shafts, a high speed driving member mounted on said driving shaft, a low speed driving member rotatably mounted on said driven shaft, an overrunning clutch member slidably mounted on said driven shaft, a shift fork for moving said clutch member into engagement with said low speed member to provide a low speed overrunning drive between said shafts, a clutch unit slidably mounted on said driven shaft and having positive and free wheeling clutch elements, a shift fork for moving said clutch unit to engage the positive clutch element thereon with said low speed member to provide a positive low speed drive between said shafts, and to engage the free wheeling clutch element thereon with said high speed member, common means for simultaneously moving said shift forks to move said clutch into engagement with said low speed member and for relatively moving said shift forks to move the free wheeling clutch element of the clutch unit into engagement with said high speed member and to retain said clutch member in engagement with said low speed member.

5. In a device of the class described, the combination of a driving shaft having a driving member thereon, a driven shaft having a driving member rotatably mounted thereon and connected through a train of speed reduction gearing to the driving shaft, an overrunning clutch mounted on the driven shaft and shiftable into engagement with said driven shaft member to provide an overrunning low speed drive between said shafts, a clutch unit slidably mounted on the driven shaft and provided with positive and free wheeling clutch members, means for shifting either of said clutch members into engagement with said driving shaft member subsequent to shifting said overrunning clutch into engagement with said driven shaft member and including a lost motion connection between said clutch and clutch unit whereby the former may be shifted relative to the latter, said clutch unit being provided with means operable for effecting automatic changes in the gear ratio when said clutch is in engagement with said driven shaft member and said free wheeling clutch member on said clutch unit is in engagement with said driving shaft member.

6. In a device of the class described, the combination of a driving shaft having a driving element affixed to the rear end thereof, a driven shaft in axial alignment with said driving shaft, a driving element rotatably mounted on said driven shaft adjacent the forward end thereof and connected through a train of speed reduction gears to said driving shaft, an overrunning clutch slidably mounted on said driven shaft and shiftable into engagement with said driven shaft element to provide a low speed overrunning drive between said shafts, a clutch unit slidably mounted on said driven shaft and disposed between said elements and having positive and free wheeling drive clutch members for selectively engaging each of said elements, manipulative means for moving the clutch members of the clutch unit into engagement with said elements and including means for shifting said clutch into engagement with said driven shaft element before shifting said clutch unit into engagement with said driving shaft element, said clutch unit being provided with means operable responsive to a predetermined speed of rotation of said driven shaft for providing a direct free wheeling drive between said shafts and for locking said overrunning clutch out of the drive between said shafts, said clutch unit being further shiftable to provide a direct positive drive between said shafts and for locking said last named means out of the drive between said shafts.

7. A variable speed power transmitting mechanism for connecting the engine of an automotive vehicle to the road wheels thereof comprising, coaxial driving and driven shafts adapted to be connected in a plurality of drives, intermediate and low speed driving members rotatably mounted on said driven shaft and adapted to be driven from said driving shaft, a high speed driving element carried by said driving shaft, an overrunning clutch unit slidably mounted on said driven shaft between said intermediate and said low speed elements and selectively adapted to connect the same to said driven shaft for driving the same in a plurality of drives, an automatic clutch unit provided with free wheeling and positive drive clutch elements slidably mounted on said driven shaft between said intermediate and high speed elements and selectively adapted to connect the same to said driven shaft for driving the same in a plurality of drives, each of said clutch units being provided with a shift fork controlling the operativeness thereof and mounted on a common rail so as to be capable of relative movement, and manipulative means for shifting said rail for progressively shifting said clutch units into operation, whereby said overrunning clutch will first be operative to drive said driven shaft, subsequently, either said overrunning clutch unit or said automatic clutch unit will be operative to drive said driven shaft, depending upon the speed of rotation thereof, and finally said automatic clutch unit will be operative to drive said driven shaft without regard to variations of the speed of rotation thereof.

8. A variable speed power transmitting mechanism having in combination a driving shaft having a driving member, a driven shaft having rotatably mounted thereon a low speed driving member connected through a train of gears to the driving shaft, a low speed overrunning clutch mounted on said driven shaft and cooperable with said driven shaft member for providing a one-way low speed drive between said shafts, a high speed overrunning clutch cooperable with said high speed member for providing a one-way high speed drive between said shafts and having a positive clutch member operable for locking each of said driving members respectively to said driven shaft for providing two-way high and low speed drives between said shafts, means for progressively shifting said low speed overrunning clutch into cooperative engagement with said low speed driving member and said high speed overrunning clutch into cooperative engagement with said high speed driving member successively to provide one-way drives in low and high speeds, said shifting means embodying provisions whereby said high speed overrunning clutch may be shifted relative to said low speed overrunning clutch for locking each of said members, respectively, to said driven shaft for effecting two-way low and high speed drives between said shafts.

9. A variable speed power transmitting mechanism having in combination a driving shaft having a driving member thereon, a driven shaft having rotatably mounted thereon a low speed driving member connected through a train of gears to said driving shaft, a low speed free wheeling clutch slidably mounted on said driven shaft and adapted to be moved into engagement with said low speed member to provide a one-way drive between said shafts, a high speed overrunning clutch slidably mounted on said driven shaft and provided with positive and free wheeling clutch members, each of which is adapted to be selectively moved into engagement with said high speed member to provide a two-way and a one-way drive, respectively, between said shafts, and means for shifting said low speed free wheeling clutch into engagement with said low speed member and for subsequently shifting said high speed overrunning clutch into engagement with said high speed member when said free wheeling clutch is in engagement with said low speed member, said means including a lost motion connection between said clutches whereby said overrunning clutch may be moved relative to said free wheeling clutch.

10. A variable speed power transmitting mechanism having in combination a driving shaft having a driving element thereon, a driven shaft having a driving element rotatably mounted thereon and connected through a train of speed reduction gearing to the driving shaft, an overrunning clutch mounted on said driven shaft and shiftable into engagement with said driven shaft element to provide a free wheeling low speed drive between said shafts, a clutch unit slidably mounted on said driven shaft and provided with positive and free wheeling clutch members and with centrifugal force responsive means for controlling the operation of said free wheeling clutch member, means for shifting either of said clutch members into engagement with said high speed element subsequently to shifting said overrunning clutch into engagement with said driven shaft element and including a lost motion connection between said clutch and clutch unit whereby the clutch unit may be shifted relative to the clutch for changing the drive between said shafts without moving said clutch out of engagement with said driven shaft element.

11. A variable speed power transmitting mechanism having in combination a driving shaft having a driving element affixed to the rear end thereof, a driven shaft in axial alignment with said driving shaft, a driving element rotatably mounted on said driven shaft adjacent the forward end thereof and connected through a train of speed reduction gears to said driving shaft, an overrunning clutch slidably mounted on said driven shaft and shiftable into engagement with said driven shaft element to provide a low speed free wheeling drive between said shafts, a clutch unit slidably mounted on said driven shaft and disposed between said elements and having positive and free wheeling drive clutch members for selectively engaging said driving shaft element for connecting the same to said driven shaft in a one-way or two-way drive, manipulative means for moving the clutch members of said clutch unit into engagement with said element and including means for shifting said clutch into engagement with said driven shaft element before shifting said clutch unit into engagement with said driving shaft element, said clutch unit being operable for locking said driven shaft element out of the drive between said shafts when in engagement with said driving shaft element.

12. A variable speed power transmitting mechanism having in combination two driving elements adapted to rotate at different rates of speed and driven from a common source, a shaft adapted to be selectively connected to said driving element to be driven thereby, an overrunning clutch for each of said elements and adapted to connect the same to said driven shaft, means for shifting one of said clutches into engagement with the slower rotating of said elements to provide a one-way drive between said element and said shaft and for subsequently shifting the other of said clutches into engagement with the faster rotating of said elements to provide a one-way drive between said element and said shaft while retaining said first mentioned clutch in engagement with the slower rotating of said elements and for overshifting the other of said clutches to provide a two-way drive between the faster rotating of said elements and said shaft, and including a lost motion connection between said clutches.

13. A variable speed power transmitting mechanism having in combination two driving elements adapted to rotate at different rates of speed and driven from a common source, a shaft adapted to be selectively connected to said driving element to be driven thereby, an overrunning clutch for each of said driving elements and adapted to connect the same to said driven shaft for driving the same, means for progressively shifting said clutches into engagement with the slower and faster rotating of said gears for providing successive one-way drives between each of said driving elements and shafts, respectively, said overrunning clutch engageable with the faster rotating of said driving elements being provided with centrifugal means operable for rendering the same operable and inoperable, and a lost motion connection between said clutches whereby one may be moved relative to the other.

14. A variable speed power transmitting mechanism having in combination two driving elements adapted to rotate at different rates of speed and driven from a common source, a shaft adapted to be selectively connected to said driving elements to be driven thereby, an overrunning clutch for the slower rotating of said elements and a positive clutch for the faster rotating of said driving elements, said clutches being connected to the driven shaft, means for simultaneously shifting said clutches to engage one of the same with the slower rotating of said driving elements for providing a one-way drive between the same and said shaft and for overshifting the other of said clutches to engage the faster rotating of said driving elements for providing a two-way drive between the same and said shaft.

CARL F. RAUEN.
REX E. KELLER.